(No Model.) 4 Sheets—Sheet 1.
D. G. WEEMS.
ELECTRIC RAILWAY.
No. 425,966. Patented Apr. 15, 1890.
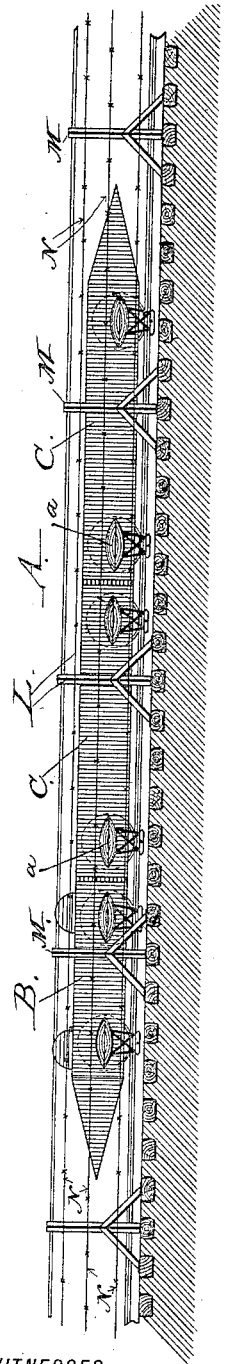
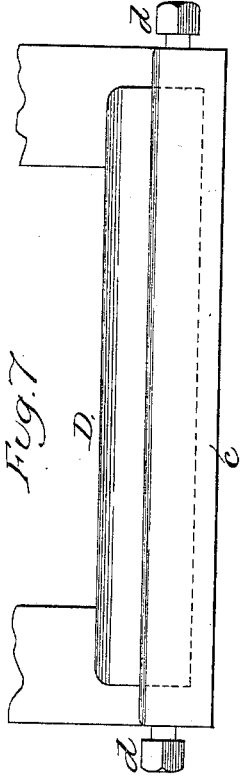
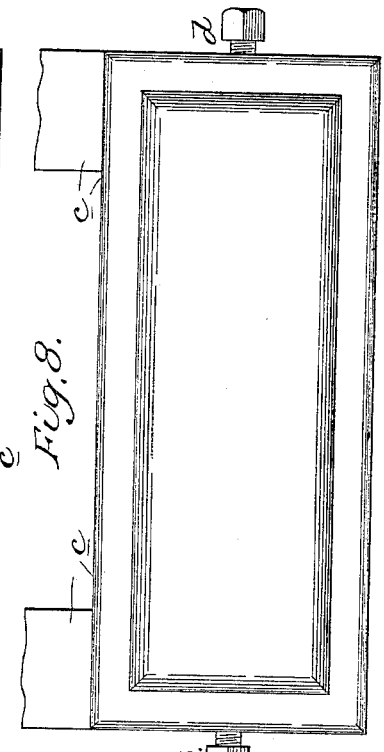
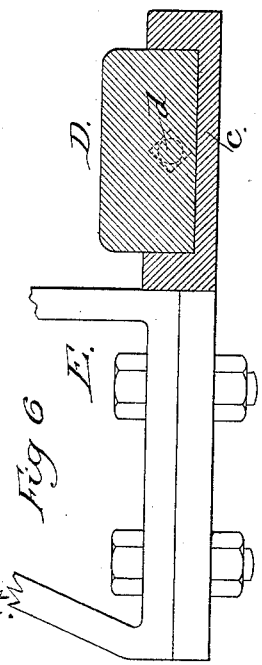
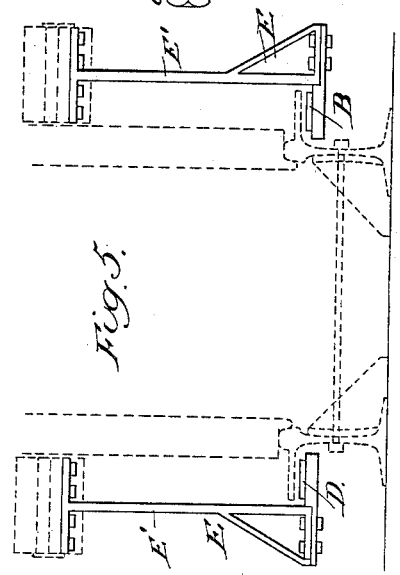
WITNESSES:
INVENTOR
David G. Weems
BY
A. H. Evans & Co
ATTORNEYS (No Model.) 4 Sheets—Sheet 2.
D. G. WEEMS.
ELECTRIC RAILWAY.
No. 425,966. Patented Apr. 15, 1890.
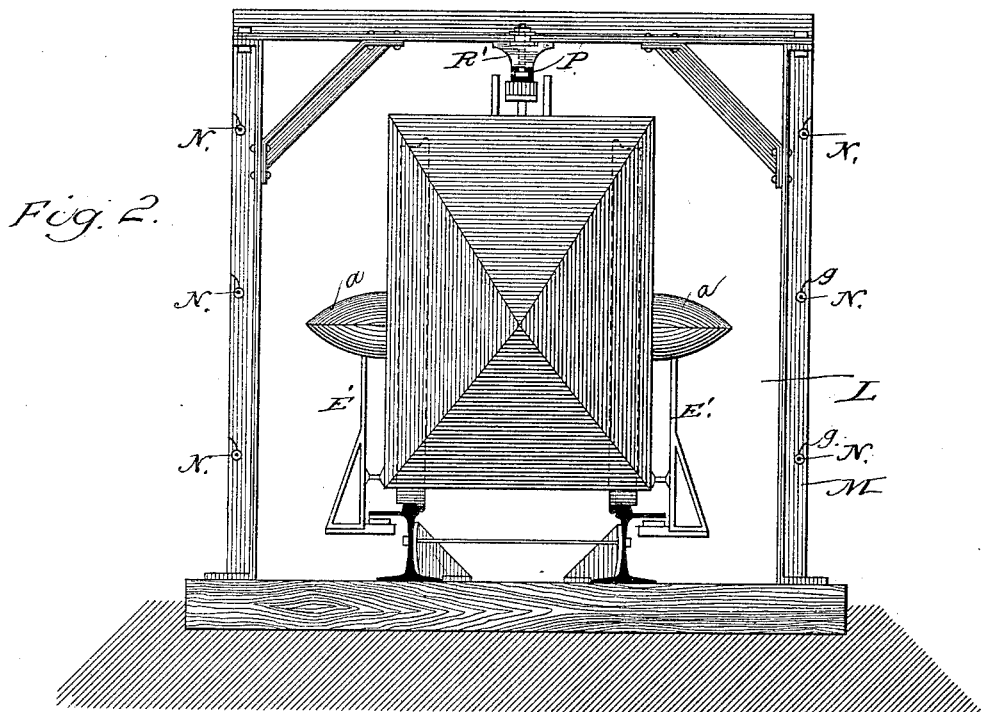
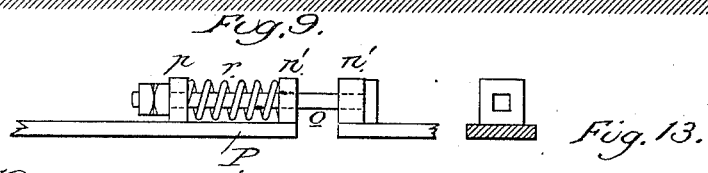
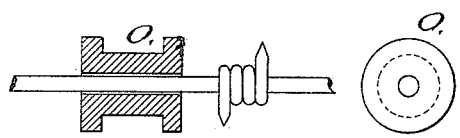
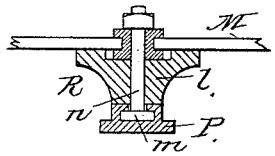
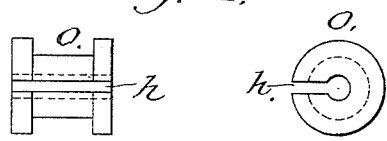
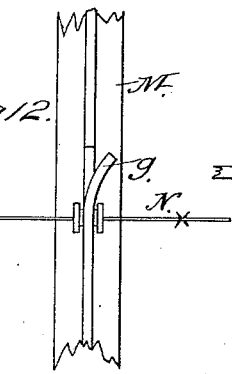
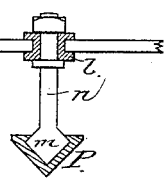
WITNESSES:
INVENTOR
BY
ATTORNEYS.

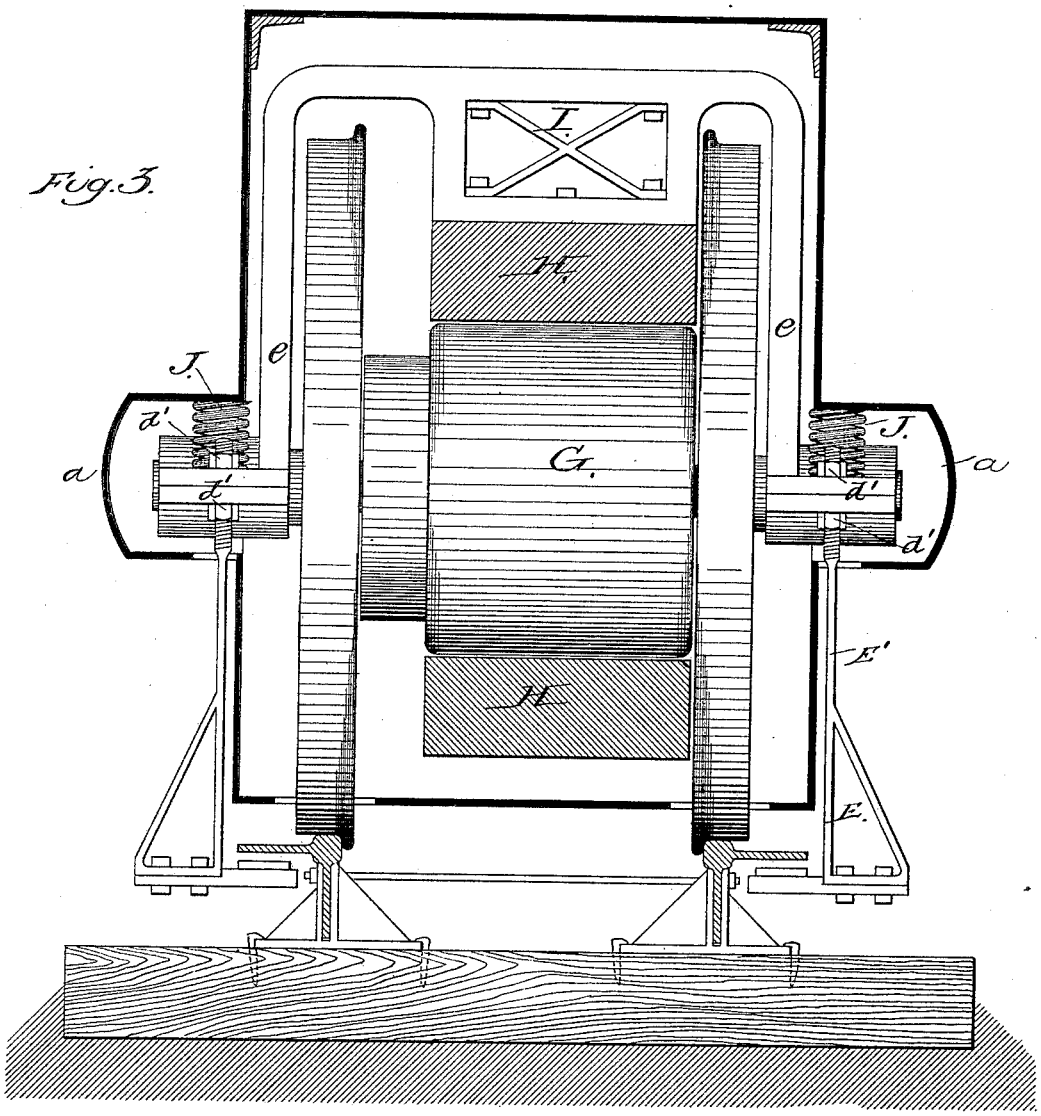

(No Model.) 4 Sheets—Sheet 4.

D. G. WEEMS.
ELECTRIC RAILWAY.

No. 425,966. Patented Apr. 15, 1890.

WITNESSES
T. W. Fowler
W. H. Patterson

INVENTOR
David G. Weems,
by A. H. Evans & Co
Attorney

UNITED STATES PATENT OFFICE.

DAVID G. WEEMS, OF BALTIMORE, MARYLAND, ASSIGNOR TO THE ELECTRO-AUTOMATIC TRANSIT COMPANY, OF SAME PLACE.

ELECTRIC RAILWAY.

SPECIFICATION forming part of Letters Patent No. 425,966, dated April 15, 1890.

Application filed August 1, 1889. Serial No. 319,421. (No model.)

*To all whom it may concern:*

Be it known that I, DAVID G. WEEMS, a citizen of the United States, residing at Baltimore city, in the State of Maryland, have invented certain new and useful Improvements in Electric Railways, of which the following is a full and clear description, reference being had to the accompanying drawings, forming part of this specification, in which—

Figure 4:
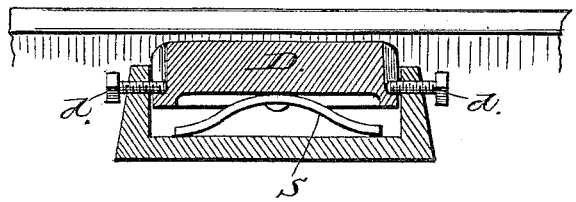
Figure 15:
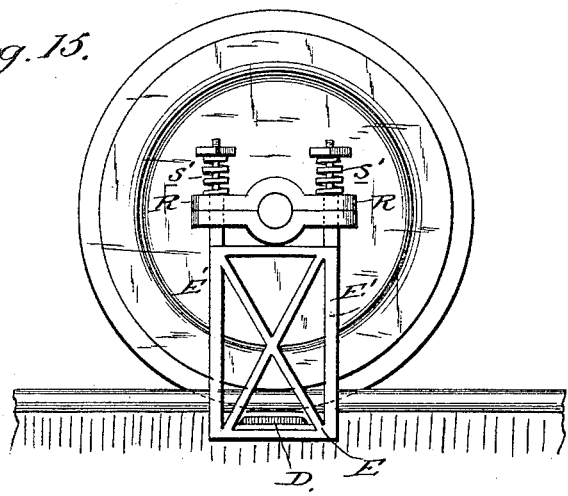

Figure 1 represents a section of track, a train of cars thereon, and the housing or frame in which the train travels. Fig. 2 is an end view of the same. Fig. 3 illustrates a transverse sectional view of the locomotive and track, showing the armature, the field-magnets therefor, and the frame from which the field-magnets are suspended. Fig. 4 shows the supplemental bearing block or shoe, which is designed to travel beneath laterally-projecting flanges of the main rails. Figs. 5, 6, 7, and 8 are details of the supplemental bearing blocks or shoes and frames. Fig. 9 illustrates the conductor for the current and a means for accommodating the expansion and contraction thereof. Fig. 10 illustrates a portion of one of the wires of the inclosing-frames and a sectional and end view of one of the insulating-spools. Fig. 11 shows views of an insulating-spool of modified form. Fig. 12 illustrates a portion of one of the posts and a means for securing the wire thereto. Fig. 13 is a section of one of the insulating-buttons which holds the conductor in place to the frame-work or housing. Fig. 14 illustrates a modification of the same. Fig. 15 is a modification of the bearing block or shoe shown in Fig. 4.

My invention relates to certain new and useful improvements in railway systems in which a train of cars is propelled by an electric current, the said train being especially adapted for the rapid transportation of mail and express packages; and my invention consists in the constructions and combinations of devices which I shall hereinafter fully describe and claim.

To enable others skilled in the art to which my invention appertains to make and use the same, I will now describe its construction and indicate the manner in which the same is carried out.

In the said drawings, A indicates a section of a line of surface railway with a train thereon, B being the locomotive, which contains any well-known form of electric motor, and C the cars, which are adapted to contain mail, express-packages, &c., the said train being propelled by an electric current from one or more generating-stations. (Not herein shown, but which is fully disclosed in my former patents, particularly Patent No. 376,567, dated January 17, 1888.) The front of the locomotive and the rear of the end car have pointed ends, and said locomotive and cars have semi-elliptic housings *a* for the journals of the main wheels.

In my former patent, No. 406,804, granted July 9, 1889, I secured to arms depending from the locomotive and cars supplemental wheels, which were designed to travel slightly below the under surface of projecting flanges of the main rails, and be brought into contact with said under surface when the main wheels attempted to leave their track when rounding curves or from other means.

In the present case I dispense with the supplemental wheels and use in place thereof a sliding friction in the shape of a bearing block or shoe D of suitable material, which is let into a grooved seat in the lateral arm *c* of the block-supporting frame E, secured to the locomotive and cars, and preferably to the journal-boxes thereof, as plainly shown in Fig. 3, the block itself being held securely in its grooved seat by means of screws or bolts *d*, as shown in Figs. 5, 6, and 7.

The bearing block or shoe shown in Fig. 4 rests upon a stout spring or cushion S, which is interposed between the bottom of the block or shoe and the bottom of the grooved seat, while in the sides of the block or shoe are formed grooves, into which the ends of the screws pass, whereby the block or shoe is guided in its movements. This construction is a very desirable one, for should the block or shoe suddenly come into contact with the lateral flange of the rail the spring or cushion will enable the block to yield, thereby overcoming any sudden shock or strain upon the shoe or the frame which supports it.

In Fig. 15 I illustrate another form of yielding bearing block or shoe, wherein the arms of the frame which supports the shoe are extended upwardly through the flanges of the journal-boxes and are provided with springs $s'$, which rest between the flanges R of the upper cap of the journal-boxes and a collar or nut on the arms of the shoe-supporting frame. The operation of this construction is substantially like that described for Fig. 4. This construction is also very simple, the blocks being readily inserted and removed when desired, and can be replaced when worn with new ones at slight expense. At the same time a more positive resistance is offered by the sliding blocks engaging the under surface of the flange of the rail than when a rolling friction is used. The upwardly-extending arms $E'$ of the frame E will preferably pass through openings in the bottom of the journal-box housings, and may have their upper ends threaded and passed through the flanges of the journal-boxes, and being engaged by nuts $d'$, whereby the frame may be vertically adjusted to regulate the distance between the bottom of the flange of the rail and the top surface of the bearing-block or shoe, so that when the latter is worn the frame may be raised sufficiently to insure the proper contact with the under surface of the flange in the event of the main wheels attempting to leave the upper tread or main bearing-surface of the rails.

The locomotive or motor-car has its armature G secured on the axle midway between the field-magnets H, but not in contact therewith, a small space being left between the armature and field-magnets, as shown in Fig. 3, and which space is always maintained without regard to the vibrations of the car. This latter result is accomplished through the aid of a frame I, from which the field-magnets are suspended. This frame I is formed with arms or extensions $e$, which are firmly secured to the journal-boxes, whereby the field-magnets are held in position upon the axle, so that whatever be the vibrations of the car the relative positions of the armature and field-magnets with respect to each other are always maintained.

The casing of the locomotive or car is supported upon stout springs J, which are placed between the journal-boxes and the housings on the cars, and these springs are designed to provide for the vibrations of the car. Therefore while the armature and field-magnets always maintain a fixed position with relation to each other the casing or outside covering of the car may yield to the vibrations incident to any irregularities in the track.

In my system the trains are designed to travel at a rapid speed, and therefore it is necessary to provide means for preventing pedestrians and horses, cattle, and other animals from getting on the track and endangering themselves and the track and rolling-stock. To provide against such contingencies I construct a light and substantial housing or frame-work L along the track for the trains to run in, and such a frame I prefer to form of angle-iron or other posts M and horizontal wires N, which are secured to the posts by forming a tongue $g$ in the latter, (see Fig. 12,) and then slipping the wire in position and forcing the tongue over it so as to hold the wire securely to the post. These wires not only assist in forming the frame for the train to run in, but may be used for telegraphic or telephonic purposes by connecting them in any suitable manner with a current of electricity, and they may be barbed, so that they will not only slightly shock any animal coming against them, but will also prick them. The amount of current, however, which will pass through these wires will not be sufficient to injure animals that contact with them. To carry out this part of my invention it will be necessary to insulate the wires where they are fastened to the posts, and this I do by any well-known means, but preferably by the spools O of suitable insulating material. (See Figs. 10 and 11.) In the former figure the spool is slipped on the wire during the manufacture of the latter, while in Fig. 11 the spool is grooved at $h$, and may be fitted on the wires after the latter is in position, and then clamped thereon by pressing the grooved part together. These wires therefore not only form part of the frame-work, but may serve as a substitute for the overhead wires which are usually strung upon poles along the line of road.

The main conductor P, which drives the motors on the train, is secured to the under side of the top of the frame L by buttons R, as shown in Fig. 13, having a portion $l$ of non-conducting material, which insulates the conductor from the said frame, and the bolts $n$, which secure the buttons to the top portions of the frame-work, are provided with heads $m$, which are adapted to fit in corresponding grooves in the upper surface of the conductor P, whereby said conductor may expand and contract without any strain upon the bolts.

To provide for the expansion and contraction of the conductor, I not only groove the rail, as described, but I also form the meeting ends of adjacent sections thereof with lugs $n'$, having holes for the passage of a bolt $o$, around which and between the lug $n'$ and movable piece $p$, fitted in the grooves of the conductor, is a coiled or other spring $r$, which is normally slightly compressed. It will thus be seen that when the conductor expands the spring operates to keep the conductor taut, and when said conductor contracts the spring yields. All "buckling" of the conductor is therefore provided against.

In Fig. 14 I illustrate a modification of the securing-button in Fig. 13, in which case the bolt-head will be approximately spear-shaped, and will be fitted in a similarly-shaped groove in the conductor, which in this instance will be V-shaped.

Having thus described my invention, what I claim as new, and desire to secure by Letters Patent, is—

1. In electric railways, the combination, with rails having laterally-projecting flanges and a car or train adapted to travel upon said rails, of a frame suspended from the car or train and carrying a bearing-block or shoe which is designed to have a sliding engagement with the under surface of the flanges of the rails.

2. In electric railways, the combination, with a rail having a laterally-projecting flange whose under surface forms a supplemental track, and a car or train, of a frame suspended from the car or train and having a lateral arm provided with a grooved seat, and a bearing-block or shoe secured in said seat and adapted to bear against the under surface of the flange of the rail, substantially as described.

3. In electric railways, the combination, with rails having laterally-projecting flanges whose under surface forms a supplemental track, of a vertically-adjustable frame having a bearing-block or shoe adapted to bear against said flange, substantially as described.

4. In electric railways, the rails thereof having lateral flanges whose under surfaces form a track, and a car or train, of the frames having their upper ends threaded and secured to the journal-boxes of the car or train, an arm projecting laterally from each of said frames and having a grooved seat, and a bearing-block or shoe adapted to be fitted in said seat and to engage the under surface of the lateral flange of the rail, substantially as described.

5. In electric railways, the combination, with the motor-car, of the axle thereof carrying the armature G, and a frame supporting the field-magnets and having side extensions or arms secured to the journal-boxes of said axle, whereby the space between the armature and field-magnets is always maintained, substantially as described.

6. In electric railways, the combination, with the motor-car, an armature carried by the main axle, and springs or cushions between the casing of the car and the journal-boxes for the axle, of a vertically-disposed frame carrying the field-magnets, and provided with arms or extensions which project downward and are secured to said journal-boxes, whereby the frame is suspended, substantially as described.

7. In electric railways, the combination, with rails having laterally-projecting flanges whose under surfaces form a supplemental track, and a car or train, of shoes or bearing-blocks carried by the car or train and adapted to engage the supplemental track when the car or train attempts to leave the main track, substantially as described.

8. In electric railways, the combination, with rails having laterally-projecting flanges whose under surfaces form a supplemental track, of cushioned or yielding bearing-blocks or shoes carried by the car beneath the flanges of the rail, so as to engage the supplemental track.

9. In electric railways, the rails thereof having laterally-projecting flanges whose under surfaces form a supplemental track, in combination with a car or train having the depending frames provided with grooved seats, bearing-blocks or shoes in said seats below the flanges of the rails, and springs in said seats and supporting the blocks or seats, substantially as described.

10. In electric railways, the rails thereof having laterally-projecting flanges whose under surfaces form a supplemental track, frames depending from the cars or train and having lateral arms with grooved seats, bearing-blocks in said seats below the flanges of the rail, springs beneath the blocks or shoes, and screws or bolts for securing the blocks or shoes in the seats, said blocks or shoes having grooved sides for the ends of the screws or bolts, whereby the blocks or shoes may have a yielding movement, substantially as described.

11. In electric railways, wires extending along the line of track and forming a part of an inclosing-frame for the train to run in, said wires being adapted for the transmission of an electric current.

12. In electric railways, wires extending along the line of track and forming a guard and part of an inclosed frame for the train to run in, said wires being adapted to convey an electric current and provided with barbs, substantially as described.

13. In electric railways, a frame or housing for the train to run in, in combination with wires thereon forming part of the frame and adapted to convey an electric current, said wires being insulated from the frame, substantially as described.

14. In electric railways, the frame or housing in which the train is adapted to run, consisting of the angle-iron or other posts having tongues $g$, barbed wires fitted to said posts and held in place by the tongues, and spools of insulating material on the wires and insulating them from the posts, said wires being adapted to convey a current of electricity, substantially as and for the purpose described.

15. In electric railways, the main conductor thereof having its upper surface grooved longitudinally, said conductor having the meeting ends of its sections provided with lugs, in combination with bolts or rods connecting said sections and having springs thereon, and bolts securing the conductor in place and having heads fitted in the grooves, substantially as described.

16. In electric railways, the main conductor having its upper surface grooved, a support for said conductor, bolts securing the conductor to the support and having heads fitting the grooves, and buttons insulating the conductor from the support, substantially as described.

DAVID G. WEEMS.

Witnesses:
T. B. EIKER,
C. H. GEORGE.